United States Patent [19]

Emig et al.

[11] Patent Number: 5,435,650
[45] Date of Patent: Jul. 25, 1995

[54] GUIDE SLEEVE

[75] Inventors: Jürgen Emig, Grasellenbach; Horst Renner, Weschnitz, both of Germany

[73] Assignee: Firma Carl Freudenberg, Weinheim, Germany

[21] Appl. No.: 190,427

[22] Filed: Feb. 2, 1994

[30] Foreign Application Priority Data

Feb. 4, 1993 [DE] Germany ............. 43 03 177.3

[51] Int. Cl.$^6$ ............. F16C 29/02; F16C 17/02; F16C 33/08
[52] U.S. Cl. ............. 384/29; 384/275; 384/296
[58] Field of Search ............. 384/26, 29, 32, 41, 384/42, 276, 282, 295, 296, 297–300, 16

[56] References Cited

U.S. PATENT DOCUMENTS

| | | | |
|---|---|---|---|
| 2,815,253 | 12/1957 | Spriggs | 384/299 |
| 2,916,338 | 12/1959 | Muschalek, Jr. | 384/276 |
| 3,008,779 | 11/1961 | Spriggs | 384/299 |
| 4,862,789 | 9/1989 | Burgess et al. | 384/42 X |

Primary Examiner—Thomas R. Hannon
Attorney, Agent, or Firm—Kenyon & Kenyon

[57] ABSTRACT

A guide sleeve for a rod or shaft movable parallel to the longitudinal axis in relative manner, comprising an outer ring and a guide ring of plastic inserted therein, wherein the outer ring and the guide ring are firmly attached to each other. The outer ring and the guide ring contact each other over a continuous contact surface, the outer ring being provided with grooves which are radially open towards the inside and have a cross-sectional constriction in the region of their mouth and the guide ring being provided with radially outward protruding projections which are received in the grooves.

14 Claims, 5 Drawing Sheets

GUIDE SLEEVE

BACKGROUND OF THE INVENTION

The present invention relates to a guide sleeve for a rod or shaft which can be moved relative and parallel to the rod or shaft axis, comprising an outer ring and a guide ring of plastic inserted therein, the outer ring and the guide ring being fastened to each other.

Such guide sleeves are generally known and are used for instance for supporting piston rods. One of the problems extent in the use of guide sleeves concerns the connection between the outer ring and guide ring. If the guide ring consists of a plastic which has particularly good sliding properties, such as PTFE, then it is generally difficult to achieve a reliable and stable connection of the guide ring to the outer ring for long periods of use. This is disadvantageous from the standpoint of manufacture and economy.

There remains a need for the further development of a guide sleeve of the type indicated above in such a manner that a reliable connection between the outer ring and the guide ring is assured for long periods of use, while permitting its manufacture in a simple and cost-effective manner.

SUMMARY OF THE INVENTION

This invention meets this need by providing a guide sleeve configured to accommodate a rod or shaft that executes a linear, reciprocating or axial rotational movement with respect to the guide sleeve. The guide sleeve is made of two parts, the first being an outer ring having an inner surface on which are a number of grooves. The grooves further have mouth portions that include projections that form a cross-section constriction in the area of the mouths. The second part of the guide sleeve is a plastic guide ring that is formed to mate with the grooves on the outer ring. The guide ring includes radially outwardly directed projections which are configured to mate with the grooves of the outer ring and thereby establish a firm connection between the two. The outer ring and the guide ring contact each other along a continuous contact surface.

It is advantageous in this connection that the outer ring and the guide ring be connected to each other in form-locked manner in the region of their facing surfaces. Relative mobility or separation of the two parts with respect to each other is thereby avoided, whether a rod or shaft is axially moved with respect to the outer ring and ring guide pair, or is moved rotationally. Furthermore, it is of advantage that even where the components that are accommodated within the guide sleeve exhibit increasing surface roughness over their period of use, separation between the outer ring and the guide ring does not occur. The use of a form-locked connection between the outer ring and the guide ring makes possible the problem free connection even of a plastic having a particularly small coefficient of friction to an outer ring consisting of a hard material.

According to a first embodiment, the grooves can be distributed in the circumferential direction and extend parallel to the axis of the sleeve. Such a development suggests itself in particular when the component to be guided is a rotating shaft. In that case, the grooves extend essentially perpendicular to the circumferential movement of the shaft, and any relative twisting of the outer ring with respect to the guide ring is reliably avoided by the presence of such interlocked grooves extending parallel to the shaft axis. The projections with which the guide ring engages into the grooves of the outer ring can preferably have a length from the mouth in radial direction towards the outside which corresponds essentially to the thickness of the material of the guide ring in circumferential direction between adjacent grooves. The ratio of the radial extent of the projections to the thickness of the material of the guide ring between adjacent grooves can advantageously lie in the range of 0.25 to 2. The radial extent of the projections depends on the plastic of the guide ring that is being used. In case of a comparatively small length, there can even be used plastics that are relatively difficult to shape, as a complete filling of the grooves by the projection is assured as a result of the manufacture.

In accordance with a further embodiment, the grooves and the axis can form an acute angle with respect to each other. The course of the grooves, which in that case is essentially helical, on the inner circumference of the outer ring results in a reliable securing in position of the guide ring even if the component to be guided carries out a composite translational and rotational movement.

Additionally, there can also be provided intersecting grooves. The essentially lattice-like inner circumferential surface of the outer ring and a similar outer circumference surface of the guide ring, the profiles of outer ring and guide ring being in engagement with each other, result in an interlocking effect, the outer ring and the guide ring being held stationary with respect to each other even if oppositely directed mechanical stresses act on both parts. Such stresses can be caused for instance in the manner that the outer ring is held in a relatively stationary manner within a housing while the guide ring is applied against and surrounds a reciprocating rod.

When the grooves of the outer ring and the projections of the guide ring extend parallel to the axis of the guide ring, grooves can be provided which terminate at an axial distance from at least one end surface of the outer ring. It has proven advantageous, in order to prevent the guide ring from shifting in both axial directions relative to the outer ring, to provide successive grooves in circumferential direction which terminate alternately at an axial distance from the one or from the other end surface of the outer ring. A form-locked connection of outer ring and guide ring is then present both when a rotating structural part and when a reciprocating structural part moving along a straight line are to be guided. It is to be noted in this connection that the production of a guide ring designed in this manner is relatively simple from the standpoint of manufacturing technology due to the grooves of the outer ring extending only parallel to the axis as compared with intersecting grooves.

The grooves can be distributed uniformly in circumferential direction. It is provided in this connection that depending on the circumstances of the application in question, at least three grooves are in engagement with corresponding projections of the guide ring.

In accordance with another embodiment, grooves can be provided which extend transverse to the axis. Such a development results in the securing of the guide ring against axial displacement, relative to the outer ring surrounding it, when structural parts are guided which carry out only a reciprocating movement. This is the case for instance when the structural part to be guided is formed by the piston rod of a spring leg of a motor vehicle.

The guide ring can be delimited in axial direction at least at one end by a sealing lip which protrudes radially inward, is integrally formed thereon and surrounds the rod or shaft to be guided in sealing manner. Impurities which are present on the side facing away from the space to be sealed off are reliably kept away from the guide ring by the sealing lip during operation. Sealing lips which are formed in the region of the ends of the guide ring afford advantages in particular when the structural part to be guided carries out a reciprocating motion in axial direction and surface regions are thereby conducted through the guide ring which were previously exposed to impurities. The sealing lip which is developed as a scraper prevents impurities from leading to abrasive wear on the surface of the guide ring and thus resulting in an early failure of the guide sleeve.

The guide sleeve can be produced by a method in which a guide ring of plastic is inserted into an outer ring of a hard material, heated, radially compressed with the outer ring and then cooled. In order to assure reliable association of guide ring and outer ring with respect to each other during a long period of use, the guide ring is radially widened and then cooled after insertion into the outer ring while filling the grooves of the outer ring which have a constricted cross section in the region of the mouth. By providing the grooves with an undercut, one obtains thereby certain advantages over grooves which are of rectangular or semi-circular development and are not provided with an undercut. Namely, that for the production of the guide ring plastics can be used which do not otherwise enter into any adhesive connection with the outer ring. In case of different thermal expansion of outer ring and guide ring, which contact each other over a continuous area, the grooves, which are provided with a constricted cross-section in the region of their mouth, prevent the formation of a radial gap. Such a gap can otherwise form due to differing rates of thermal radial widening and/or contraction of one of the two adjacent parts. (The gap can become so large that the two parts are no longer in engagement with each other.)

BRIEF DESCRIPTION OF THE DRAWINGS

The guide sleeve according to the invention will be explained in greater detail below with reference to the accompanying drawings, in which.

DETAILED DESCRIPTION

Figure 1B:
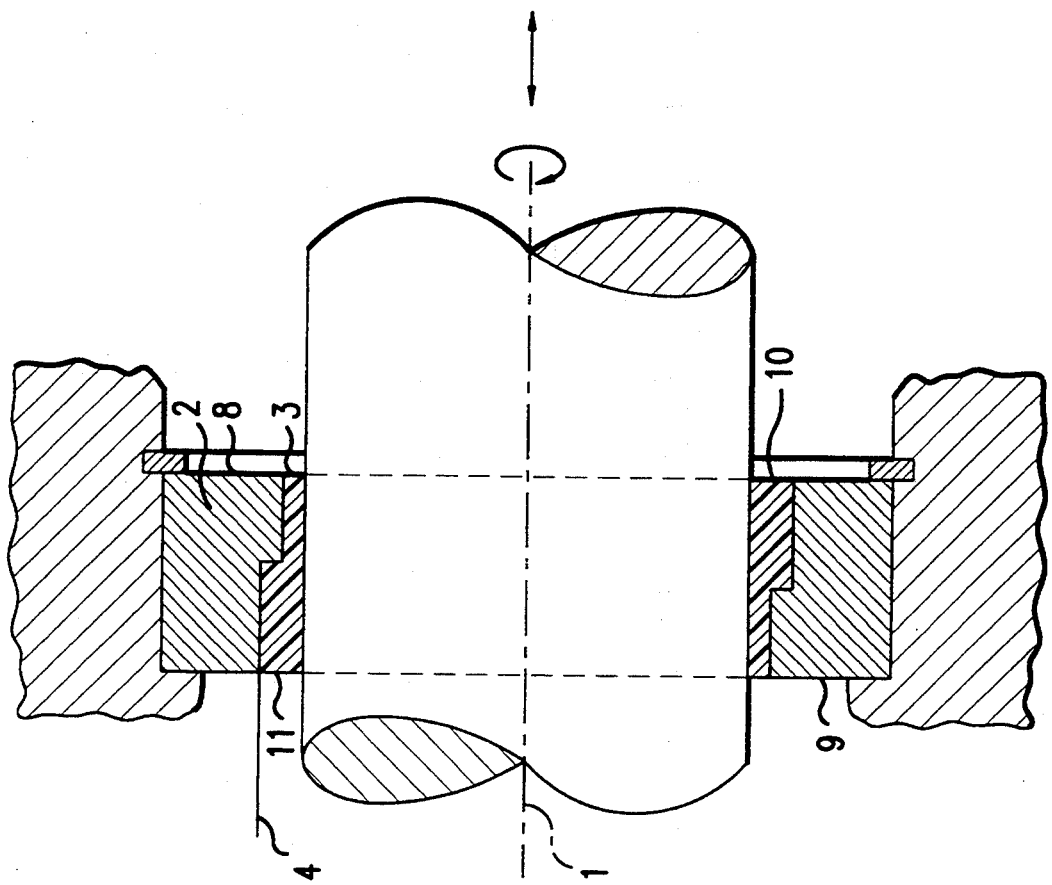
FIG. 1B is a view of the guide sleeve of FIG. 1B as installed on a shaft.

FIGS. 1A to 4 illustrate an embodiment of a guide sleeve such as may be used for guiding a piston rod in the spring legs of vehicles. The guide sleeve consists of a metallic outer ring 2 which surrounds a guide ring 3 that is made of PTFE on its outer circumference. The outer ring 2 is provided with grooves 6 which extend parallel to the axis 1 and which are open in the direction of the guide ring 3 and provided with a cross-sectional constriction in the region of their mouth 5 (see FIG. 2B). In the grooves 6, there are received radially outward protruding projections 7 which are developed integral with the guide ring 3. The grooves 6 of the outer ring 2, in the same manner as the projections 7 of the guide ring 3, are distributed uniformly in circumferential direction. In the embodiment shown in FIGS. 1A, 1B, and 4, the grooves 6 of the outer ring 2 which follow each other in circumferential direction are axially aligned, and terminate alternately at an axial distance from the one end surface 8 and from the other end surface 9 of the outer ring 2. This development has the result that the guide ring 3 is reliably held in its position within the outer ring 2 both under the action of both axially directed stresses and circumferentially directed stresses. From the standpoint of manufacture and economy, the production of such a guide sleeve is particularly advantageous due to the grooves extending parallel to the axis 1. The projections 7 of the guide ring 3 result from a shaping process.

The guide ring 3 of plastic is first inserted into the outer ring 2. For better deformability, the guide ring 3 is heated. The heated guide ring 3 is then widened in the radial direction, the plastic passing through the mouths 5 of the grooves 6 and filling them. After subsequent cooling of the guide ring 3, the latter is securely held within the outer ring 2 both in circumferential and in the axial directions. The undercut grooves 6 of the outer ring 2 help provide uniformly good support of the two rings on each other.

Figure 1A:
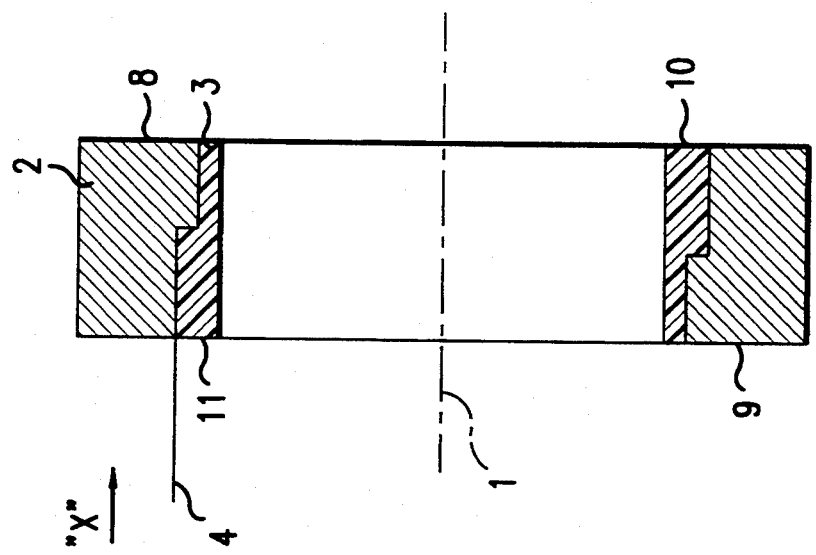
FIG. 1A is a longitudinal cross-section of a first embodiment of a guide sleeve.
Figure 2A:
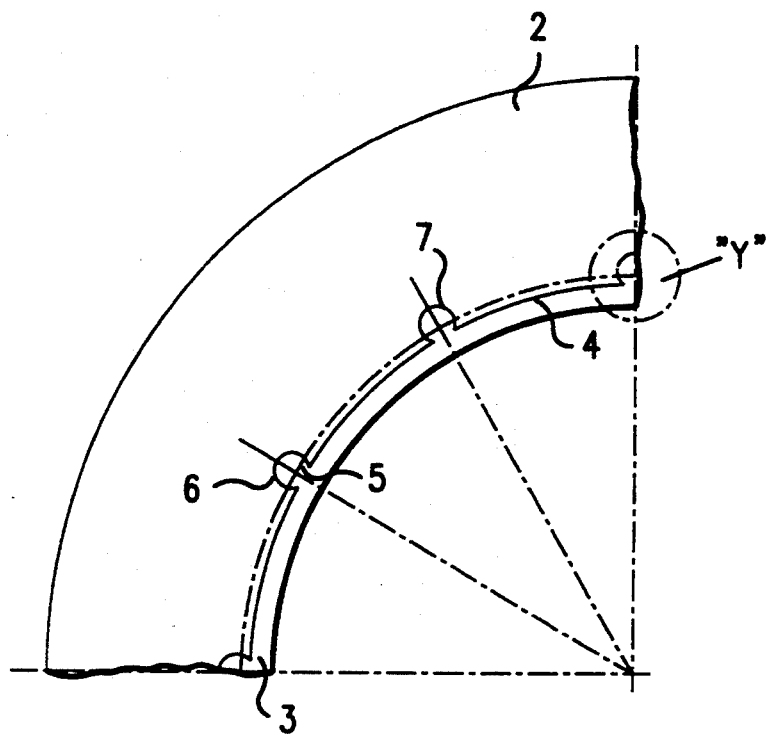
FIG. 2A is a traverse cutout of the guide sleeve of FIG. 1A, seen from the left of FIG. 1A.
Figure 2B:
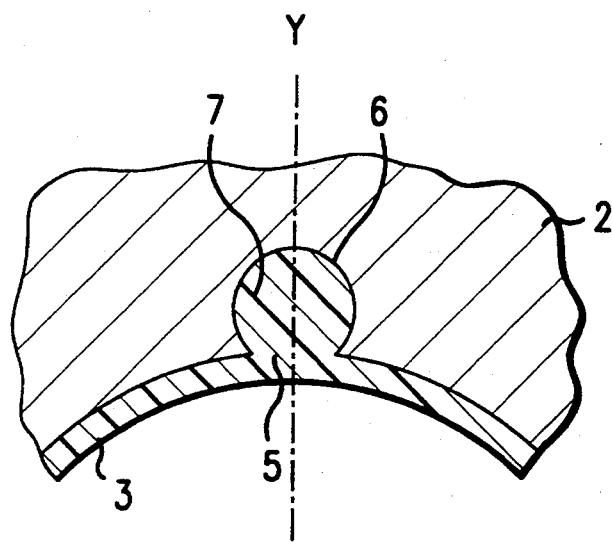
FIG. 2B is an enlarged view of a portion of FIG. 2A, showing the cooperation between a projection and a slot.

FIGS. 2A and 2B show a cut-out of the view of the guide sleeve according to FIG. 1A from which it can be seen that the projections 7 of the guide ring 3 completely fill the grooves 6 of the outer ring 2. The guide ring 3 contacts the outer ring 2 along a continuous contact surface 4.

Figure 3:
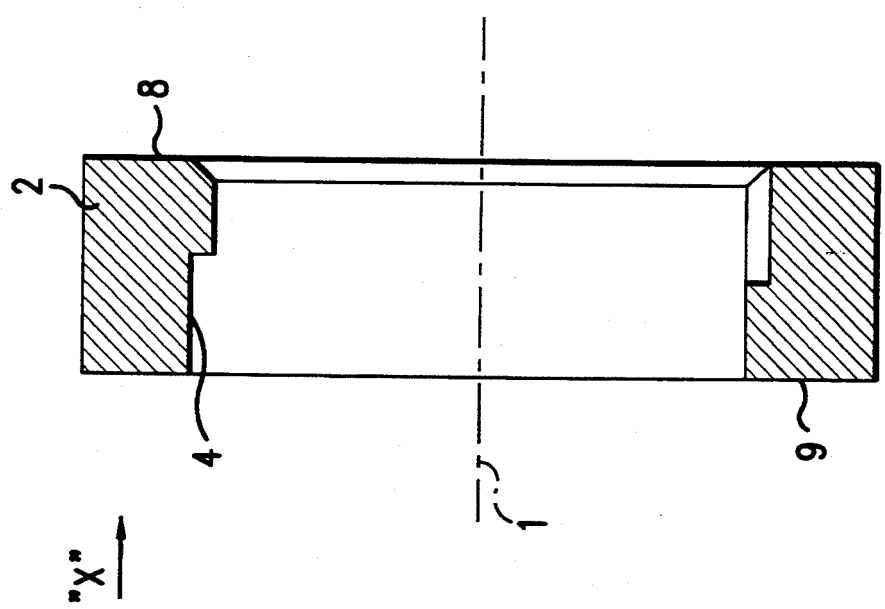
FIG. 3 shows the outer ring of the guide sleeve of FIG. 1A as individual part.

FIG. 3 shows the outer ring of FIG. 1A as a separate element.

Figure 4:
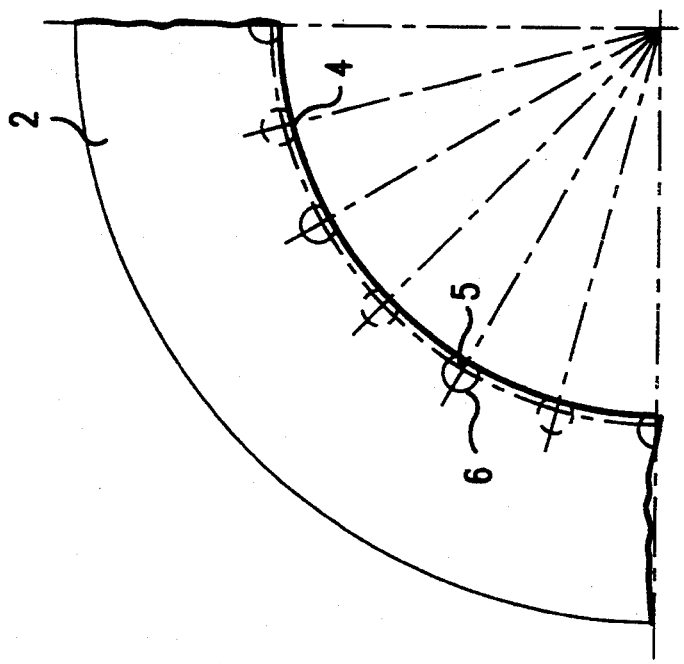
FIG. 4 is a traverse cutout of the outer ring of FIG. 3, seen from the left.

It can be noted in conjunction with FIG. 4 that the grooves 6 which follow each other in circumferential direction terminate alternately at an axial distance from the one end surface 8 and from the other end surface 9 of the outer ring 2. The grooves 6 which are axially open in the direction of the one end surface 8, are shown by dashed lines in FIG. 4.

Figure 6:
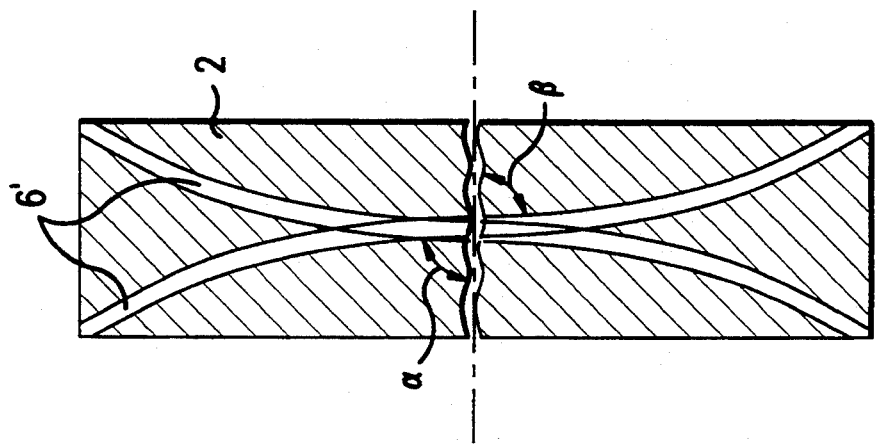
FIG. 6 is a longitudinal sectional view of an additional embodiment of the outer ring, in which there are provided intersecting helical grooves.
Figure 5:
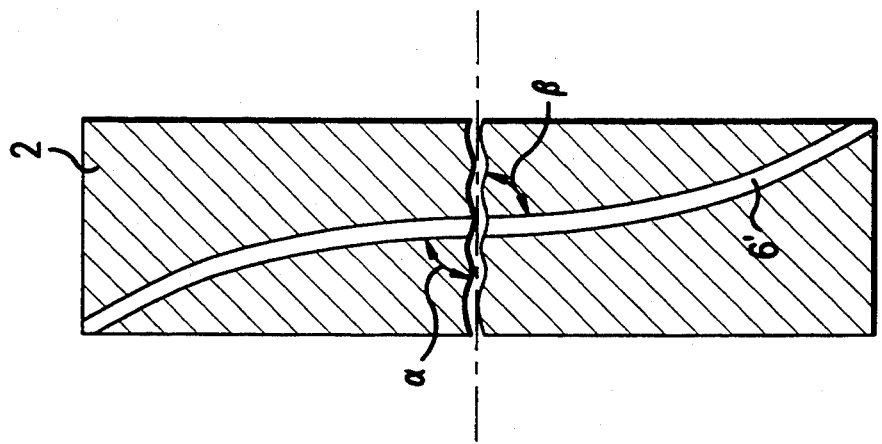
FIG. 5 is a longitudinal sectional view of an additional embodiment of the outer ring, in which the grooves are helically arrayed.
Figure 7:
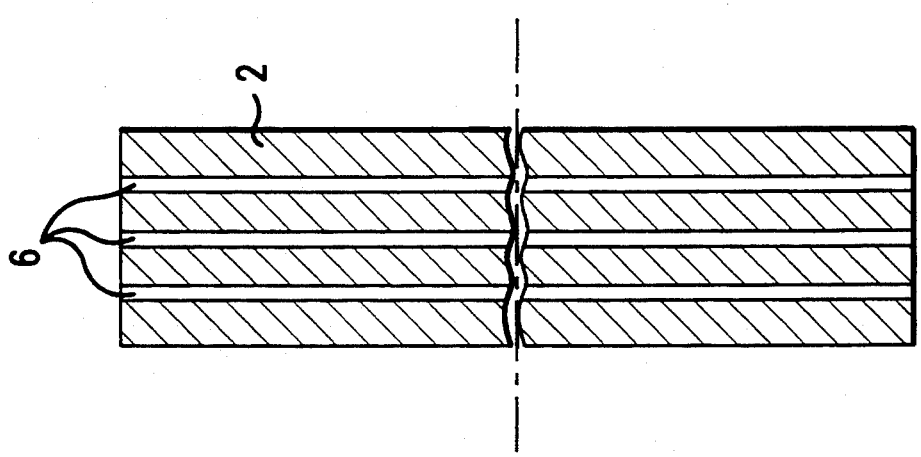
FIG. 7 is a longitudinal sectional view of an additional embodiment of the outer ring, in which the outer ring is provided with orthogonally intersecting grooves.

FIGS. 5–7 illustrate still further embodiments in which the grooves located along the inner surface of the outer ring 2 are not axially aligned. In FIG. 5, the grooves are provided in helical form, so that they lie at an acute angle with respect to a projection of the axis 1. In FIG. 6, sets of intersecting helical grooves are employed. FIG. 7 illustrates yet another embodiment, in which orthogonal grooves (e.g., axially aligned and circumferentially aligned) are provided. It should be appreciated that in each of these embodiments, the grooves mate with a corresponding projection from the guide ring 3 and provide an interlock which impedes both axial and rotational movements of the guide ring with respect to the outer ring.

Figure 8:
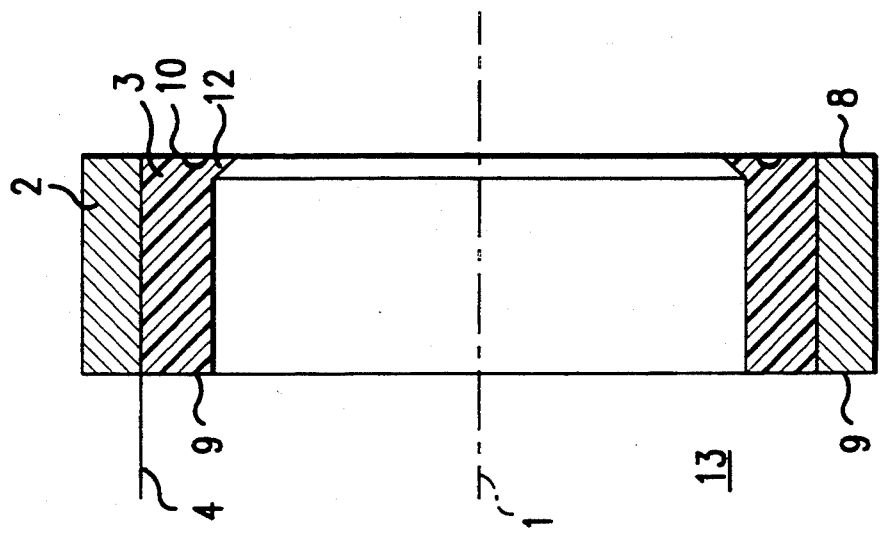
FIG. 8 shows a second embodiment of a guide sleeve wherein the guide ring is provided with a sealing lip in radial direction inside in the region of the one axial end.

A further embodiment is shown diagrammatically in FIG. 8. In the region of the inner circumference of the guide ring 3, a sealing lip 12, integrally formed thereon, is provided which surrounds the structural part to be guided in sealing manner on its circumference. The sealing lip 12 extends in radial direction inward and is developed integral with the guide ring 3 consisting of plastic. Such a development can, for instance, be used when a piston rod is sealed which, in the case of this embodiment, is exposed to impurities to the right of the sealing lip 12. A displacement of the piston rod towards the left in the direction of the sealed-off space 13 has, due to the scraper-effect of the sealing lip 12, no influence on the inner circumferential surface of the guide ring which would reduce its period of use. Any abrasive wear that might otherwise occur due to the intrusion of abrasive material is thus effectively prevented by the sealing lip 12.

We claim:

1. A guide sleeve for a rod or shaft which is movable parallel to the axis in relative manner, comprising:
    an outer ring having an outer surface and a radially inner surface, said outer ring having a plurality of grooves located along the inner surface of the outer ring that are open in the radially inward direction, said grooves further having a mouth portion and a cross-sectional constriction in the region of their mouth; and
    a plastic guide ring that includes radially outward protruding projections which are received in the grooves of the outer ring, the outer ring and the guide ring being firmly attached to each other, wherein the outer ring and the guide ring contact each other along a continuous contact surface and further have a common longitudinal axis.

2. A guide sleeve according to claim 1, further comprising circumferentially distributed axial grooves that extend parallel to the longitudinal axis.

3. A guide sleeve according to claim 2, wherein grooves are provided which terminate at an axial distance from at least one end surface of the outer ring.

4. A guide sleeve according to claim 2, wherein grooves are provided which follow each other in circumferential direction and which terminate alternately at an axial distance from the one end surface and from the other end surface of the outer ring.

5. A guide sleeve according to claim 2, further comprising grooves that extend transverse to the longitudinal axis.

6. A guide sleeve according to claim 1, wherein the grooves lie at an acute angle with respect to the longitudinal axis of the guide sleeve.

7. A guide sleeve according to claim 6, further comprising intersecting grooves.

8. A guide sleeve according to claim 6, wherein grooves are provided which follow each other in circumferential direction and which terminate alternately at an axial distance from the one end surface and from the other end surface of the outer ring.

9. A guide sleeve according to claim 6, wherein the grooves are uniformly distributed in the circumferential direction.

10. A guide sleeve according to claim 1, wherein grooves are provided which follow each other in circumferential direction and which terminate alternately at an axial distance from the one end surface and from the other end surface of the outer ring.

11. A guide sleeve according to claim 10, wherein the grooves are uniformly distributed in the circumferential direction.

12. A guide sleeve according to claim 1, wherein grooves are provided which terminate at an axial distance from at least one end surface of the outer ring.

13. A guide sleeve according to claim 1, wherein the grooves are uniformly distributed in the circumferential direction.

14. A guide sleeve according to claim 1, wherein the guide ring is axially delimited at least at one end by a sealing lip which is integrally formed thereon, surrounds the rod or shaft to be guided in sealing manner and protrudes radially inward.

* * * * *